(12) United States Patent
Asai

(10) Patent No.: US 12,110,442 B2
(45) Date of Patent: *Oct. 8, 2024

(54) DISPERSANT COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventor: Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/004,304

(22) PCT Filed: Aug. 16, 2021

(86) PCT No.: PCT/JP2021/029943
§ 371 (c)(1),
(2) Date: Jan. 5, 2023

(87) PCT Pub. No.: WO2022/044871
PCT Pub. Date: Mar. 3, 2022

(65) Prior Publication Data
US 2023/0303931 A1 Sep. 28, 2023

(30) Foreign Application Priority Data
Aug. 31, 2020 (JP) .................................. 2020-146309

(51) Int. Cl.
| | | |
|---|---|---|
| *C09K 23/52* | (2022.01) | |
| *C08F 236/12* | (2006.01) | |
| *H01G 11/36* | (2013.01) | |
| *H01G 11/38* | (2013.01) | |
| *H01G 11/86* | (2013.01) | |
| *H01M 4/505* | (2010.01) | |
| *H01M 4/525* | (2010.01) | |
| *H01M 4/62* | (2006.01) | |

(52) U.S. Cl.
CPC ............ *C09K 23/52* (2022.01); *C08F 236/12* (2013.01); *H01G 11/36* (2013.01); *H01G 11/38* (2013.01); *H01G 11/86* (2013.01); *H01M 4/505* (2013.01); *H01M 4/525* (2013.01); *H01M 4/623* (2013.01); *H01M 4/625* (2013.01)

(58) Field of Classification Search
CPC ....... C09K 23/52; C08F 236/12; H01G 11/36; H01G 11/38; H01G 11/86; H01G 11/30; H01M 4/505; H01M 4/525; H01M 4/623; H01M 4/625; H01M 4/0404; H01M 4/133; H01M 4/1393; H01M 4/587; H01M 4/62; H01M 10/0525; H01M 4/02; H01M 4/04; H01M 4/13; H01M 4/139; Y02E 60/10

See application file for complete search history.

(56) References Cited

U.S. PATENT DOCUMENTS

| | | |
|---|---|---|
| 10,388,961 B2 | 8/2019 | Fukumine et al. |
| 11,152,623 B2 | 10/2021 | Takahashi et al. |
| 2015/0050554 A1* | 2/2015 | Fukumine ........... H01M 4/0416 252/182.1 |
| 2016/0376421 A1* | 12/2016 | Obrecht ................ C08L 15/005 524/347 |
| 2018/0198126 A1 | 7/2018 | Fukumine et al. |
| 2022/0059843 A1 | 2/2022 | Nakai |

FOREIGN PATENT DOCUMENTS

| | | |
|---|---|---|
| CN | 107710472 A | 2/2018 |
| JP | 2004123940 A | 4/2004 |
| JP | 2013008485 A | 1/2013 |
| JP | 2018145434 A | 9/2018 |
| WO | 2017010093 A1 | 1/2017 |
| WO | 2019181870 A1 | 9/2019 |
| WO | 2020137594 A1 | 7/2020 |

OTHER PUBLICATIONS

Feb. 28, 2023, International Preliminary Report on Patentability issued in the International Patent Application No. PCT/JP2021/029943.
Nov. 2, 2021, International Search Report issued in the International Patent Application No. PCT/JP2021/029943.
Nov. 2, 2021, Written Opinion of the International Searching Authority issued in the International Patent Application No. PCT/JP2021/029943.
Sep. 14, 2023, the Supplementary European Search Report issued by the European Patent Office in the corresponding European Patent Application No. 21861299.2.
Sep. 26, 2023, Communication pursuant to Article 94(3) EPC issued by the European Patent Office in the corresponding European Patent Application No. 21861299.2.

* cited by examiner

*Primary Examiner* — Andrew J. Oyer
(74) *Attorney, Agent, or Firm* — KENJA IP LAW PC

(57) ABSTRACT

Provided is a novel technique related to electrochemical devices that can cause an electrochemical device to display excellent rate characteristics and high-temperature storage characteristics. The electrochemical device is produced using a dispersant composition for an electrochemical device that contains a polymer A. This polymer A includes a nitrile group-containing monomer unit and has an intrinsic viscosity of not less than 0.15 dL/g and less than 1.20 dL/g when dissolved in N-methyl-2-pyrrolidone and measured at a temperature of 25° C.

11 Claims, No Drawings

DISPERSANT COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a dispersant composition for an electrochemical device, a conductive material dispersion liquid for an electrochemical device, a slurry for an electrochemical device electrode, an electrode for an electrochemical device, and an electrochemical device.

BACKGROUND

Electrochemical devices such as lithium ion secondary batteries, lithium ion capacitors, and electric double-layer capacitors have characteristics such as compact size, light weight, high energy-density, and the ability to be repeatedly charged and discharged, and are used in a wide range of applications. Consequently, in recent years, attempts have been made to improve electrochemical device members such as electrodes with the aim of achieving even higher electrochemical device performance.

For example, Patent Literature (PTL) 1 proposes a binder composition for a secondary battery that contains a solvent and a polymer having a specific structure at a terminal thereof. PTL 1 reports that by using a conductive material paste for a secondary battery electrode that contains this binder composition and a conductive material to produce a slurry composition for a secondary battery electrode, it is possible to disperse the conductive material well in the obtained slurry composition for a secondary battery electrode, and that by using this slurry composition for a secondary battery electrode, it is possible to cause a secondary battery to display excellent battery characteristics such as output characteristics.

CITATION LIST

Patent Literature

PTL 1: WO2019/181870A1

SUMMARY

Technical Problem

However, there is room for improvement of a conventional slurry composition such as that described in PTL 1 in terms of improving rate characteristics and high-temperature storage characteristics of an electrochemical device such as a secondary battery.

Accordingly, one object of the present disclosure is to provide a dispersant composition for an electrochemical device that can cause an electrochemical device to display excellent rate characteristics and high-temperature storage characteristics.

Another object of the present disclosure is to provide a conductive material dispersion liquid for an electrochemical device that can cause an electrochemical device to display excellent rate characteristics and high-temperature storage characteristics.

Another object of the present disclosure is to provide a slurry for an electrochemical device electrode that can cause an electrochemical device to display excellent rate characteristics and high-temperature storage characteristics.

Another object of the present disclosure is to provide an electrode for an electrochemical device that can cause an electrochemical device to display excellent electrical characteristics and an electrochemical device that has excellent rate characteristics and high-temperature storage characteristics.

Solution to Problem

The inventor conducted diligent investigation with the aim of solving the problem set forth above. The inventor discovered that it is possible to enhance rate characteristics and high-temperature storage characteristics of an electrochemical device by using a dispersant composition for an electrochemical device containing a polymer (hereinafter, referred to as "polymer A") that includes a nitrile group-containing monomer unit and that has an intrinsic viscosity within a specific range when dissolved in N-methyl-2-pyrrolidone (hereinafter, also abbreviated as "NMP") and measured at a temperature of 25° C. and, in this manner, the inventor completed the present disclosure.

Specifically, the present disclosure aims to advantageously solve the problem set forth above, and a presently disclosed dispersant composition for an electrochemical device comprises a polymer A, wherein the polymer A includes a nitrile group-containing monomer unit, and the polymer A has an intrinsic viscosity of not less than 0.15 dL/g and less than 1.20 dL/g when dissolved in N-methyl-2-pyrrolidone and measured at a temperature of 25° C. By using a dispersant composition for an electrochemical device containing a polymer A that includes a nitrile group-containing monomer unit and that has an intrinsic viscosity of not less than 0.15 dL/g and less than 1.20 dL/g when dissolved in NMP and measured at a temperature of 25° C. in this manner, it is possible to cause an electrochemical device to display excellent rate characteristics and high-temperature storage characteristics.

Note that the "intrinsic viscosity" of the polymer A can be measured by a method described in the EXAMPLES section. Moreover, in the case of a polymer that is a dry solid that does not contain a solvent, such as a powdered, granular, or rubbery polymer, the polymer can be dissolved in NMP as a solvent and then be measured based on JIS K 7367-1.

Furthermore, the phrase "includes a monomer unit" as used in the present disclosure means that "a polymer obtained with that monomer includes a repeating unit derived from the monomer".

The presently disclosed dispersant composition for an electrochemical device preferably further comprises not less than 0.01 mass % and not more than 0.2 mass % of a substituted phenol relative to the polymer A. When a substituted phenol is included in the range set forth above relative to the polymer A, gelation of the dispersant composition for an electrochemical device can be inhibited.

Moreover, the present disclosure aims to advantageously solve the problem set forth above, and a presently disclosed conductive material dispersion liquid for an electrochemical device comprises at least: any one of the dispersant compositions for an electrochemical device set forth above; a conductive material; and a solvent. By using a conductive material dispersion liquid for an electrochemical device that contains at least the dispersant composition for an electrochemical device set forth above, a conductive material, and a solvent in this manner, it is possible to cause an electrochemical device to display excellent rate characteristics and high-temperature storage characteristics.

In the presently disclosed conductive material dispersion liquid for an electrochemical device, the conductive material is preferably one or more carbon nanotubes. When the conductive material is carbon nanotubes, rate characteristics of an electrochemical device can be improved.

The presently disclosed conductive material dispersion liquid for an electrochemical device preferably has a solid content concentration of not less than 0.01 mass % and not more than 10 mass % and a viscosity at a shear rate of $10\ s^{-1}$ of not less than 0.05 Pa·s and not more than 15.0 Pa·s. When the solid content concentration is not less than 0.01 mass % and not more than 10 mass % and the viscosity at a shear rate of $10\ s^{-1}$ is not less than 0.05 Pa·s and not more than 15.0 Pa·s, the conductive material dispersion liquid for an electrochemical device can be used to produce a slurry for an electrochemical device electrode having excellent coatability. Moreover, rate characteristics of an electrochemical device can be further improved by using the obtained slurry for an electrochemical device electrode.

Furthermore, the present disclosure aims to advantageously solve the problem set forth above, and a presently disclosed slurry for an electrochemical device electrode comprises at least: any one of the dispersant compositions for an electrochemical device set forth above; a conductive material; a solvent; and an electrode active material. A slurry for an electrochemical device electrode that is produced using any one of the dispersant compositions for an electrochemical device set forth above can cause an electrochemical device to display excellent rate characteristics and high-temperature storage characteristics.

Also, the present disclosure aims to advantageously solve the problem set forth above, and a presently disclosed electrode for an electrochemical device comprises an electrode mixed material layer formed using the slurry for an electrochemical device electrode set forth above. An electrode that includes an electrode mixed material layer formed using the slurry for an electrochemical device electrode set forth above can cause an electrochemical device to display excellent rate characteristics and high-temperature storage characteristics.

Moreover, the present disclosure aims to advantageously solve the problem set forth above, and a presently disclosed electrochemical device comprises the electrode for an electrochemical device set forth above. An electrochemical device that includes the electrode for an electrochemical device set forth above has excellent rate characteristics and high-temperature storage characteristics.

Advantageous Effect

According to the present disclosure, it is possible to provide a dispersant composition for an electrochemical device that can cause an electrochemical device to display excellent rate characteristics and high-temperature storage characteristics.

Moreover, according to the present disclosure, it is possible to provide a conductive material dispersion liquid for an electrochemical device that can cause an electrochemical device to display excellent rate characteristics and high-temperature storage characteristics.

Furthermore, according to the present disclosure, it is possible to provide a slurry for an electrochemical device electrode that can cause an electrochemical device to display excellent rate characteristics and high-temperature storage characteristics.

Also, according to the present disclosure, it is possible to provide an electrode for an electrochemical device that can cause an electrochemical device to display excellent electrical characteristics and an electrochemical device that has excellent rate characteristics and high-temperature storage characteristics.

DETAILED DESCRIPTION

The following provides a detailed description of embodiments of the present disclosure.

The presently disclosed dispersant composition for an electrochemical device can be used in production of a conductive material dispersion liquid for an electrochemical device and a slurry for an electrochemical device electrode. Moreover, a conductive material dispersion liquid for an electrochemical device and a slurry for an electrochemical device electrode that are produced using the presently disclosed dispersant composition for an electrochemical device can be used in formation of an electrode of an electrochemical device such as a lithium ion secondary battery. Furthermore, the presently disclosed electrochemical device includes an electrode for an electrochemical device that has been formed using the presently disclosed slurry for an electrochemical device electrode.

Note that the presently disclosed dispersant composition for an electrochemical device, conductive material dispersion liquid for an electrochemical device, and slurry for an electrochemical device electrode can, in particular, suitably be used in production of a positive electrode of an electrochemical device.

(Dispersant Composition for Electrochemical Device)

The presently disclosed dispersant composition for an electrochemical device (hereinafter, also referred to simply as a "dispersant composition") contains at least a specific polymer A that is described in detail below. Examples of components other than the polymer A that may be contained in the dispersant composition include, but are not specifically limited to, a substituted phenol described in detail further below, a solvent, other components that can be contained in an electrode of an electrochemical device, and so forth. Note that the presently disclosed dispersant composition does not normally contain a conductive material or an electrode active material.

As a result of the presently disclosed dispersant composition containing the polymer A, it is possible to cause an electrochemical device to display excellent rate characteristics and high-temperature storage characteristics by using this dispersant composition.

Although it is not clear why rate characteristics and high-temperature storage characteristics of an electrochemical device are improved by using the presently disclosed dispersant composition, the reason for this is presumed to be as follows.

As a result of the polymer A that is contained in the presently disclosed dispersant composition having a specific intrinsic viscosity, the polymer A can adsorb to the surface of a conductive material, which protects the surface of the conductive material and inhibits reaggregation of the conductive material. Consequently, dispersibility of the conductive material is stabilized. Therefore, by using such a dispersant composition to produce a slurry for an electrochemical device electrode, it is possible to stabilize dispersibility of a conductive material in the slurry for an electrochemical device electrode, and then by using this slurry for an electrochemical device electrode, it is possible to form an electrode for an electrochemical device in which a good electrical conduction network has been formed. Consequently, an electrochemical device can be caused to display excellent rate characteristics by using such an electrode for an electrochemical device. In addition, as a result of the polymer A having a specific intrinsic viscosity, it is possible to inhibit side reactions due to the conductive material in an electrode for an electrochemical device that has been formed using the slurry for an electrochemical device electrode. Therefore, an electrochemical device can be caused to display excellent high-temperature storage characteristics by using this electrode for an electrochemical device.

<Polymer A>

The polymer A contained in the presently disclosed dispersant composition is required to include a nitrile group-containing monomer unit as a repeating unit and may optionally further include repeating units other than a nitrile group-containing monomer unit (hereinafter, referred to as "other repeating units").

[Nitrile Group-Containing Monomer Unit]

A nitrile group-containing monomer unit is a repeating unit that is derived from a nitrile group-containing monomer. Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. One of these nitrile group-containing monomers may be used individually, or two or more of these nitrile group-containing monomers may be used in combination. Of these nitrile group-containing monomers, acrylonitrile is preferable.

The proportional content of nitrile group-containing monomer units in the polymer A when all repeating units in the polymer A are taken to be 100 mass % is preferably 10 mass % or more, and more preferably 15 mass % or more, and is preferably 50 mass % or less, more preferably 45 mass % or less, and even more preferably 40 mass % or less. When the proportional content of nitrile group-containing monomer units in the polymer A is not less than any of the lower limits set forth above, viscosity stability of a conductive material dispersion liquid improves, and high-temperature storage characteristics of an electrochemical device can be enhanced. On the other hand, when the proportional content of nitrile group-containing monomer units in the polymer A is not more than any of the upper limits set forth above, an increase of intrinsic viscosity of the polymer A is suppressed, which makes it possible to cause an electrochemical device to display excellent rate characteristics and high-temperature storage characteristics.

Note that the proportional content (mass %) of each monomer unit referred to in the present disclosure can be measured by a nuclear magnetic resonance (NMR) method such as 1H-NMR.

[Other Repeating Units]

The other repeating units are repeating units that are derived from monomers that are copolymerizable with a nitrile group-containing monomer such as described above. Examples of other repeating units include, but are not specifically limited to, an alkylene structural unit, a (meth) acrylic acid ester monomer unit, an aromatic vinyl monomer unit, and an acidic group-containing monomer unit. Note that in the present disclosure, "(meth)acrylic acid" is used to indicate "acrylic acid" and/or "methacrylic acid".

[Alkylene Structural Unit]

An alkylene structural unit that may be included in the polymer A is a repeating unit that is composed of only an alkylene structure represented by a general formula: $-C_nH_{2n}-$ (n is an integer of 2 or more). Although the alkylene structural unit may be linear or branched, the alkylene structural unit is preferably linear (i.e., is preferably a linear alkylene structural unit) from a viewpoint of further improving rate characteristics of an electrochemical device. Moreover, the carbon number of the alkylene structural unit is preferably 4 or more (i.e., n in the preceding general formula is preferably an integer of 4 or more).

No specific limitations are placed on the method by which the alkylene structural unit is introduced into the polymer A. For example, method (1) or (2) described below may be used.

(1) A method in which a polymer is produced from a monomer composition containing a conjugated diene monomer and then the polymer is hydrogenated in order to convert a conjugated diene monomer unit to an alkylene structural unit (2) A method in which a polymer is produced from a monomer composition containing a 1-olefin monomer Of these methods, method (1) is preferable in terms of ease of production of the polymer A.

The conjugated diene monomer may be a conjugated diene compound having a carbon number of 4 or more such as 1,3-butadiene, isoprene, 2,3-dimethyl-1,3-butadiene, 2-ethyl-1,3-butadiene, or 1,3-pentadiene, for example. Of these conjugated diene compounds, 1,3-butadiene is preferable.

In other words, the alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit).

The 1-olefin monomer may be ethylene, propylene, 1-butene, 1-hexene, or the like, for example.

One of these conjugated diene monomers or 1-olefin monomers may be used individually, or two or more of these conjugated diene monomers or 1-olefin monomers may be used in combination.

Selective hydrogenation of a conjugated diene monomer unit can be carried out by a commonly known method such as an oil-layer hydrogenation method or a water-layer hydrogenation method. Of these methods, it is preferable that hydrogenation is performed by oil-layer hydrogenation. Hydrogenation by oil-layer hydrogenation is described further below.

The proportional content of alkylene structural units in the polymer A when all repeating units in the polymer A are taken to be 100 mass % is preferably 40 mass % or more, more preferably 45 mass % or more, and even more preferably 50 mass % or more, and is preferably 90 mass % or less, and more preferably 85 mass % or less. When the proportional content of alkylene structural units in the polymer A is not less than any of the lower limits set forth above, dispersibility of a conductive material in a slurry for an electrochemical device electrode can be further stabilized, and deterioration of rate characteristics of an electrochemical device can be inhibited. On the other hand, when the proportional content of alkylene structural units in the polymer A is not more than any of the upper limits set forth above, side reactions due to a conductive material can be further inhibited, and high-temperature storage characteristics of an obtained electrochemical device can be further enhanced. Note that in a case in which the polymer A is a polymer that is obtained according to method (1), the total proportion constituted by alkylene structural units and conjugated diene monomer units in the polymer A preferably satisfies any of the ranges set forth above.

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination. Of these (meth) acrylic acid ester monomers, 2-ethylhexyl acrylate is preferable.

[Aromatic Vinyl Monomer Unit]

Examples of aromatic vinyl monomers that can form an aromatic vinyl monomer unit include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

[Acidic Group-Containing Monomer Unit]

Examples of acidic group-containing monomers that can form an acidic group-containing monomer unit include carboxy group-containing monomers, sulfo group-containing monomers, and phosphate group-containing monomers. One of these acidic group-containing monomers may be used individually, or two or more of these acidic group-containing monomers may be used in combination. Of these acidic group-containing monomers, methacrylic acid is preferable.

[Proportion of Other Monomer Units]

The proportional content of other monomer units (excluding alkylene structural units) in the polymer A when the amount of all repeating units in the polymer A is taken to be 100 mass % is preferably 50 mass % or less, more preferably 40 mass % or less, and even more preferably 35 mass % or less.

[Intrinsic Viscosity]

The intrinsic viscosity of the polymer A when the polymer A is dissolved in NMP and measured at a temperature of 25° C. is required to be 0.15 dL/g or more, and is preferably 0.2 dL/g or more, and more preferably 0.25 dL/g or more. Moreover, the intrinsic viscosity of the polymer A is required to be less than 1.20 dL/g, and is preferably 1.0 dL/g or less, and more preferably 0.9 dL/g or less. When the intrinsic viscosity is not less than any of the lower limits set forth above, side reactions due to a conductive material can be inhibited. On the other hand, when the intrinsic viscosity is less than any of the upper limits set forth above, dispersibility of a conductive material is stabilized. Therefore, it is possible to cause an electrochemical device to display excellent rate characteristics and high-temperature storage characteristics by using a slurry for an electrochemical device electrode that is produced using this dispersant composition.

Note that the intrinsic viscosity of the polymer A can be adjusted by, for example, altering the chemical composition of the polymer A, the flexibility of the polymer A, the production conditions of the polymer A, and so forth.

[Iodine Value]

The iodine value of the polymer A is preferably 1 mg/100 mg or more, and more preferably 3 mg/100 mg or more, and is preferably 60 mg/100 mg or less, more preferably 50 mg/100 mg or less, and even more preferably 40 mg/100 mg or less. When the iodine value of the polymer A is not less than any of the lower limits set forth above, it is possible to produce an electrochemical device having excellent gas release inhibiting ability by using a slurry for an electrochemical device electrode that is produced using the presently disclosed dispersant composition. Moreover, when the iodine value of the polymer A is within any of the ranges set forth above, it is easier to maintain the intrinsic viscosity of the polymer A within a specific range. Note that the "iodine value" can be measured by a method described in the EXAMPLES section.

[Production Method of Polymer A]

No specific limitations are placed on the method by which the polymer A described above is produced. The polymerization method in production of the polymer A is not specifically limited and may be solution polymerization, suspension polymerization, bulk polymerization, emulsion polymerization, or the like. Of these polymerization methods, emulsion polymerization is preferable. Moreover, ionic polymerization, radical polymerization, living radical polymerization, or the like may be adopted as the polymerization reaction. Furthermore, typically used emulsifiers, dispersants, polymerization initiators, molecular weight modifiers, and the like can be used in the polymerization, and the amount thereof can also be the same as typically used. In particular, it is preferable to use tert-dodecyl mercaptan as a molecular weight modifier. The additive amount of the molecular weight modifier is preferably not less than 0.3 parts by mass and not more than 2.0 parts by mass based on 100 parts by mass of monomers in a monomer composition used in the polymerization reaction. The polymerization temperature is preferably not lower than 3° C. and not higher than 80° C.

The polymerization conversion rate when the polymerization reaction is terminated is preferably more than 80%, and preferably 90% or more, and is preferably 97% or less. The polymer A can be efficiently produced when the polymerization conversion rate is within any of the ranges set forth above.

Note that a substituted phenol may be added to a dispersion liquid containing the polymer A that is obtained through the polymerization reaction.

[Substituted Phenol]

The term "substituted phenol" refers to an alkylated phenol compound including at least one phenolic hydroxy group and also including at least one alkyl group. It is preferable that the substituted phenol includes one or two phenolic hydroxy groups and also includes at least one alkyl group at an ortho position, meta position, or para position of a phenolic hydroxy group. Moreover, a substituted phenol that includes a group other than an alkyl group at an ortho position, meta position, or para position of a phenolic hydroxy group may be used. Examples of the substituted phenol include compounds represented by the following formula (1) and compounds represented by the following formula (2).

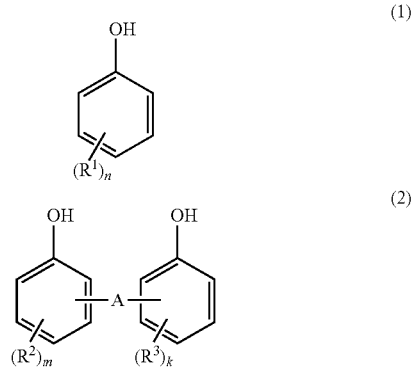

In formula (1), each $R^1$ is independently an alkyl group having a carbon number of not less than 1 and not more than 7, an alkoxy group having a carbon number of not less than 1 and not more than 5, an amino group, an amino group substituted with an alkyl group having a carbon number of not less than 1 and not more than 4, or a nitrogen-containing heterocyclic group, and n is an integer of not less than 1 and not more than 5. Moreover, at least one $R^1$ in formula (1) is an alkyl group having a carbon number of not less than 1 and not more than 7.

In formula (2), each $R^2$ or $R^3$ is independently an alkyl group having a carbon number of not less than 1 and not more than 7, an alkoxy group having a carbon number of not less than 1 and not more than 5, an amino group, an amino group substituted with an alkyl group having a carbon number of not less than 1 and not more than 4, or a nitrogen-containing heterocyclic group, A is a chemical single bond or an alkylene group having a carbon number of not less than 1 and not more than 4, and m and k are each independently an integer of not less than 1 and not more than 4. Moreover, at least one $R^2$ in formula (2) is an alkyl group having a carbon number of not less than 1 and not more than 7, and at least one $R^3$ in formula (2) is an alkyl group having a carbon number of not less than 1 and not more than 7.

Of compounds represented by formula (1), compounds including an alkyl group having a carbon number of not less than 1 and not more than 5 as $R^1$ at at least an ortho position or a para position of the phenolic hydroxy group are preferable, and compounds including an alkyl group having a carbon number of not less than 1 and not more than 5 at every one of the two ortho positions and the para position of the phenolic hydroxy group are preferable.

Of compounds represented by formula (2), compounds represented by the following formula (3) are preferable.

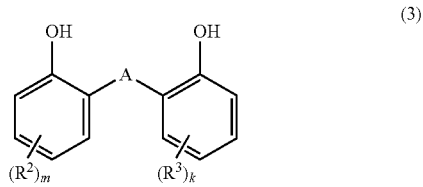

Note that $R^2$, $R^3$, A, m, and k in formula (3) are the same as in formula (2).

Of compounds represented by formula (3), compounds including an alkyl group having a carbon number of not less than 1 and not more than 5 as $R^2$ and $R^3$ at at least an ortho position or a para position in the two phenolic hydroxy groups of the two aromatic rings are preferable, and compounds including an alkyl group having a carbon number of not less than 1 and not more than 5 at every ortho position and para position in the two phenolic hydroxy groups of the two aromatic rings are preferable.

Specific examples of the substituted phenol include 2-isopropyl-5-methylphenol, 3-methyl-4-isopropylphenol, butylhydroxyanisole, 2-(2H-benzotriazol-2-yl)-4,6-di-tert-butylphenol, 2,6-di-tert-butyl-p-cresol, 2,6-di-tert-butyl-α-dimethylamino-p-cresol, a mixture of 2,6-di-tert-butylphenol, 2,4,6-tri-tert-butylphenol, and ortho-tert-butylphenol, mono(α-methylbenzyl)phenol, di(α-methylbenzyl)phenol, tri(α-methylbenzyl)phenol, a mixture of alkyl and aralkyl-substituted phenols, 2,2'-methylenebis(4-methyl-6-tert-butylphenol), 2,6-di-tert-butyl-4-methylphenol (also referred to as dibutylhydroxytoluene (BHT)), 2,2'-methylenebis (4-methyl-6-cyclohexylphenol), 2,2'-methylenebis(4-ethyl-6-tert-butylphenol), alkylated bisphenol, 4,4'-methylenebis(2,6-di-tert-butylphenol), methylene bridged polyhydric alkylphenol, butylated p-cresol and dicyclopentadiene, polybutylated bisphenol A, 4,4'-thiobis (6-tert-butyl-3-methylphenol), 4,4'-butylidenebis(3-methyl-6-tert-butylphenol), 2,4-bis[(octylthio)methyl]-o-cresol, a hindered phenol, and a hindered bisphenol. Of these substituted phenols, 2,6-di-tert-butyl-4-methylphenol and 2,2'-methylenebis(4-methyl-6-tert-butylphenol) are preferable.

In a case in which a dispersion liquid containing a polymer is obtained according to the method described above, the obtained dispersion liquid may be coagulated by salting-out through addition of calcium chloride or the like, may then be subjected to filtration, washing, drying, and the like, and may then be dissolved in an organic solvent such as acetone. Drying during the above is preferably performed under reduced pressure, and the drying temperature is preferably not lower than 70° C. and not higher than 115° C. Next, the pre-hydrogenation polymer that has been dissolved in the organic solvent may be subjected to a hydrogenation reaction by oil-layer hydrogenation so as to obtain a hydrogenation reaction product, a catalyst component may subsequently be separated from the obtained hydrogenation reaction product by filtration, and the organic solvent used in the hydrogenation reaction may then be removed to yield a hydrogenated polymer A.

Note that the hydrogenation reaction by oil-layer hydrogenation can be performed using a commonly known selective hydrogenation catalyst such as a palladium-based catalyst or a rhodium-based catalyst. One of these catalysts may be used, or two or more of these catalysts may be used in combination. In particular, a palladium-based catalyst can suitably be used. These catalysts are typically used in a mounted form on a support. The support may be silica, silica-alumina, alumina, diatomite, activated carbon, or the like.

The used amount of the catalyst can be preferably 10 ppm to 5,000 ppm, and more preferably 100 ppm to 3,000 ppm based on 100 parts by mass of the pre-hydrogenation polymer that is the subject of hydrogenation. The used amount of the catalyst can be altered as appropriate in order to adjust the iodine value of the obtained polymer A to a desired value.

The hydrogenation reaction temperature in the oil-layer hydrogenation is preferably 0° C. or higher, more preferably 10° C. or higher, even more preferably 50° C. or higher, and particularly preferably 70° C. or higher, and is preferably 200° C. or lower, more preferably 115° C. or lower, and even more preferably 105° C. or lower. The hydrogenation pressure in the oil-layer hydrogenation is preferably 0.1 MPa to 30 MPa, and more preferably 0.2 MPa to 20 MPa. The hydrogenation reaction time in the oil-layer hydrogenation is preferably 1 hour to 50 hours, and more preferably 2 hours to 25 hours.

<Solvent>

Examples of solvents that can be contained in the presently disclosed dispersant composition include, but are not specifically limited to, water and organic solvents. Examples of organic solvents that can be used include acetonitrile, N-methyl-2-pyrrolidone, tetrahydrofuran, acetone, acetylpyridine, cyclopentanone, dimethylformamide, dimethyl sulfoxide, methylformamide, methyl ethyl ketone, furfural, ethylenediamine, dimethylbenzene (xylene), methylbenzene (toluene), cyclopentyl methyl ether, and isopropyl alcohol. One of these solvents may be used individually, or two or more of these solvents may be used in combination. Of these solvents, NMP is preferable.

<Other Components>

Besides the components described above, the presently disclosed dispersant composition may contain components such as reinforcing materials, viscosity modifiers, leveling agents, viscosity modifiers, and additives for electrolyte solution. These other components are not specifically limited so long as they do not affect electrochemical device reactions, and commonly known examples thereof such as those described in WO2012/115096A1, for example, can be used. One of these components may be used individually, or two or more of these components may be used in combination.

[Proportional Content of Polymer A]

The proportional content of the polymer A in the dispersant composition can, for example, be not less than 1 mass % and not more than 40 mass % in terms of solid content, but is not specifically limited thereto.

The dispersant composition preferably contains 0.01 mass % or more, and more preferably 0.05 mass % or more of a substituted phenol such as previously described relative to the polymer A, and preferably contains 0.2 mass % or less, and more preferably 0.15 mass % or less of the substituted phenol relative to the polymer A. When the substituted phenol is contained in any of the ranges set forth above, gelation of the dispersant composition can be inhibited.

<Production of Dispersant Composition for Electrochemical Device>

The presently disclosed dispersant composition can be produced by mixing the previously described polymer A, a solvent, other components, and so forth by a known method. Specifically, the dispersant composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

Note that in a case in which the polymer A is polymerized in a solvent, a dispersion liquid having the polymer A dispersed in the solvent may be used in that form as the dispersant composition.

(Conductive Material Dispersion Liquid for Electrochemical Device)

The presently disclosed conductive material dispersion liquid for an electrochemical device (hereinafter, also referred to simply as a "conductive material dispersion liquid") contains at least the dispersant composition set forth above, a conductive material, and a solvent and optionally further contains other components that can be contained in an electrode of an electrochemical device. In other words, the conductive material dispersion liquid contains at least the polymer A, a conductive material, and a solvent and optionally further contains other components.

The presently disclosed conductive material dispersion liquid can increase dispersion stability of the conductive material in the conductive material dispersion liquid and inhibit side reactions due to the conductive material as a result of containing the dispersant composition set forth above.

<Dispersant Composition>

The presently disclosed dispersant composition set forth above is adopted as the dispersant composition that is used in the conductive material dispersion liquid.

<Conductive Material>

Examples of conductive materials that can be used include, but are not specifically limited to, conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single-layer or multi-layer graphene, and carbon non-woven fabric sheet obtained by pyrolyzing non-woven fabric made of polymer fiber; and fibers and foils of various metals. One of these conductive materials may be used individually, or two or more of these conductive materials may be used in combination. Of these examples, carbon nanotubes are preferable as the conductive material from a viewpoint of reducing the resistance of an electrode mixed material layer formed using the dispersant composition and obtaining an electrochemical device having improved rate characteristics.

[BET Specific Surface Area]

The BET specific surface area of the conductive material is preferably 100 $m^2/g$ or more, more preferably 150 $m^2/g$ or more, and even more preferably 200 $m^2/g$ or more, and is preferably 300 $m^2/g$ or less. When the specific surface area of the conductive material is not less than any of the lower limits set forth above, rate characteristics of an electrochemical device can be further improved. Moreover, when the specific surface area of the conductive material is not more than the upper limit set forth above, the conductive material dispersion liquid can be provided with excellent viscosity.

Note that the "BET specific surface area" referred to in the present disclosure is the nitrogen adsorption specific surface area measured by the BET method and can be measured in accordance with ASTM D3037-81.

<Solvent>

The solvent can function as a dispersion medium in the presently disclosed conductive material dispersion liquid. Examples of solvents that can be used in the presently disclosed conductive material dispersion liquid for an electrochemical device include, but are not specifically limited to, the same solvents as those that can be contained in the presently disclosed dispersant composition.

<Other Components>

Examples of other components that can be used include, but are not specifically limited to, the same other components as those that can be contained in the dispersant composition set forth above.

[Solid Content Concentration]

The solid content concentration in the conductive material dispersion liquid is preferably 0.01 mass % or more, more preferably 1 mass % or more, and even more preferably 3 mass % or more, and is preferably 10 mass % or less, more preferably 9 mass % or less, and even more preferably 8 mass % or less. When the solid content concentration in the conductive material dispersion liquid is not less than any of the lower limits set forth above, rate characteristics of an electrochemical device can be further improved. On the other hand, when the solid content concentration in the conductive material dispersion liquid is not more than any of the upper limits set forth above, coatability of a slurry for an electrochemical device electrode produced using the conductive material dispersion liquid improves.

[Viscosity]

The viscosity of the conductive material dispersion liquid at a shear rate of $10 \text{ s}^{-1}$ is preferably 0.05 Pa·s or more, and more preferably 0.2 Pa·s or more, and is preferably 15.0 Pa·s or less, and more preferably 5.0 Pa·s or less. When the viscosity of the conductive material dispersion liquid is not less than any of the lower limits set forth above, high-temperature storage characteristics of an electrochemical device can be further enhanced. On the other hand, when the viscosity of the conductive material dispersion liquid is not more than any of the upper limits set forth above, dispersibility of the conductive material improves, which makes it possible to improve rate characteristics of an electrochemical device by using the conductive material dispersion liquid.

[Content of Polymer A]

The content of the polymer A in the conductive material dispersion liquid can, for example, be not less than 10 parts by mass and not more than 100 parts by mass per 100 parts by mass of the conductive material, but is not specifically limited thereto.

<Production of Conductive Material Dispersion Liquid for Electrochemical Device>

The presently disclosed conductive material dispersion liquid can be produced by mixing the above-described dispersant composition, conductive material, solvent, and other optional components by a known method. The mixing method is not specifically limited and can be any of the same methods as for production of the presently disclosed dispersant composition set forth above.

Moreover, no specific limitations are placed on the order in which the above-described components are mixed. All components contained in the dispersant composition, the conductive material, the solvent, and other optional components may all be mixed in one go, or the dispersant composition set forth above may be produced and then the conductive material, the solvent, and other optional components may subsequently be mixed with the obtained dispersant composition, for example.

(Slurry for electrochemical device electrode)

The presently disclosed slurry for an electrochemical device electrode (hereinafter, also referred to simply as a "slurry for an electrode") contains at least the dispersant composition set forth above, a conductive material, a solvent, and an electrode active material and optionally further contains another polymer (hereinafter, referred to as "polymer X") and other components that can be contained in an electrode of an electrochemical device. In other words, the presently disclosed slurry contains at least the polymer A, a conductive material, a solvent, and an electrode active material and optionally further contains another polymer X and other components.

As a result of the presently disclosed slurry for an electrode containing the dispersant composition set forth above, it is possible to form an electrode for an electrochemical device that can cause an electrochemical device to display excellent rate characteristics and high-temperature storage characteristics by using this slurry for an electrode.

Although the following describes, as one example, a case in which the presently disclosed slurry for an electrochemical device electrode is a slurry for a lithium ion secondary battery positive electrode, the presently disclosed slurry for an electrochemical device electrode is not limited to the following example.

<Dispersant Composition>

The presently disclosed dispersant composition set forth above is adopted as the dispersant composition that is used in the slurry for an electrode.

<Conductive Material>

Examples of conductive materials that can be used include, but are not specifically limited to, the same conductive materials as those that can be used in the presently disclosed conductive material dispersion liquid.

<Solvent>

Examples of solvents that can be used include, but are not specifically limited to, the same solvents as those that can be used in the presently disclosed conductive material dispersion liquid.

<Electrode Active Material>

The electrode active material is a material that gives and receives electrons in an electrode of a secondary battery. A material that can occlude and release lithium is normally used as a positive electrode active material for a lithium ion secondary battery.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(CoMnNi)O_2$; $LiNi_{0.8}Co_{0.1}Mn_{0.1}O_2$), a lithium-containing complex oxide of Ni—Mn—Al, a lithium-containing complex oxide of Ni—Co—Al ($Li(CoNiAl)O_2$), olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$ without any specific limitations.

The amount and particle diameter of the positive electrode active material are not specifically limited and may be the same as those of conventionally used electrode active materials.

<Polymer X>

The other polymer X is not specifically limited and may, for example, be a fluorine-containing polymer such as polyvinylidene fluoride that serves as a binder.

<Other Components>

Examples of other components that can be used include, but are not specifically limited to, the same other components as those that can be contained in the presently disclosed dispersant composition.

[Content of Polymer A]

The content of the polymer A in the slurry for an electrode can, for example, be not less than 0.5 parts by mass and not more than 5 parts by mass per 100 parts by mass of the electrode active material, but is not specifically limited thereto.

<Production of Slurry for Electrochemical Device Electrode>

The presently disclosed slurry for an electrode can be produced by mixing the above-described dispersant composition, conductive material, solvent, electrode active material, optional polymer X, and other optional components. The mixing method is not specifically limited and can be any of the same methods as for production of the presently disclosed dispersant composition set forth above.

Moreover, no specific limitations are placed on the order in which the above-described components are mixed. All components contained in the dispersant composition, the conductive material, the solvent, the electrode active material, the optional polymer X, and other optional components may all be mixed in one go, or the conductive material dispersion liquid set forth above may be produced and then the electrode active material, the optional polymer X, and other optional components may subsequently be mixed with the obtained conductive material dispersion liquid, for example.

(Electrode for Electrochemical Device)

The presently disclosed electrode for an electrochemical device includes an electrode mixed material layer formed using the slurry for an electrode set forth above on a current collector, for example. Specifically, the electrode mixed material layer is normally formed of a dried product of the slurry for an electrode set forth above, contains at least the previously described polymer A, a conductive material, and an electrode active material, and optionally contains another polymer X and other components. Note that components contained in the electrode mixed material layer are components that were contained in the slurry for an electrode, and the preferred ratio of these components in the electrode mixed material layer is the same as the preferred ratio of the components in the slurry for an electrode.

The presently disclosed electrode for an electrochemical device can cause an electrochemical device to display excellent rate characteristics and high-temperature storage characteristics as a result of the electrode mixed material layer being formed using the slurry for an electrode set forth above.

<Formation Method of Electrode for Electrochemical Device>

The electrode mixed material layer of the presently disclosed electrode for an electrochemical device can be formed on the current collector through a step of applying the slurry for an electrode set forth above onto the current collector (application step) and a step of drying the slurry for an electrode that has been applied onto the current collector to form the electrode mixed material layer on the current collector (drying step), for example.

[Application Step]

The slurry for an electrode can be applied onto the current collector by any commonly known method without any specific limitations. Specific examples of application methods that can be used include comma coating, doctor blading, dip coating, reverse roll coating, direct roll coating, gravure coating, extrusion coating, and brush coating. During application, the slurry for an electrode may be applied onto just one side of the current collector or may be applied onto both sides of the current collector. The thickness of the slurry coating for an electrode on the current collector after application but before drying may be set as appropriate in accordance with the thickness of the electrode mixed material layer to be obtained after drying.

The current collector onto which the slurry for an electrode is applied is a material having electrical conductivity and electrochemical durability. Specifically, the current collector may be made of iron, copper, aluminum, nickel, stainless steel, titanium, tantalum, gold, platinum, or the like, for example. One of these materials may be used individually, or two or more of these materials may be used in combination in a freely selected ratio.

[Drying Step]

The slurry for an electrode on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can further improve binding capacity of the electrode mixed material layer and the current collector.

(Electrochemical Device)

The presently disclosed electrochemical device may be, but is not specifically limited to, a lithium ion secondary battery or an electric double-layer capacitor, and is preferably a lithium ion secondary battery. Moreover, the presently disclosed electrochemical device includes the presently disclosed electrode for an electrochemical device, and, as a result, has excellent rate characteristics and high-temperature storage characteristics.

Although the following describes, as one example, a case in which the electrochemical device is a lithium ion secondary battery, the presently disclosed electrochemical device is not limited to the following example. The lithium ion secondary battery that is an example of the presently disclosed electrochemical device normally includes electrodes (positive electrode and negative electrode), an electrolyte solution, and a separator, and has the presently disclosed electrode for an electrochemical device as at least one of the positive electrode and the negative electrode.

<Electrodes>

Examples of electrodes other than the electrode for an electrochemical device set forth above that can be used in the lithium ion secondary battery that is an example of the presently disclosed electrochemical device include known electrodes without any specific limitations. Specifically, an electrode obtained by forming an electrode mixed material layer on a current collector by a known production method may be used as an electrode other than the electrode for an electrochemical device set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution may be adjusted as appropriate. Moreover, a known additive such as vinylene carbonate (VC), fluoroethylene carbonate (FEC), or ethyl methyl sulfone may be added to the electrolyte solution.

<Separator>

Examples of the separator include, but are not specifically limited to, separators described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Lithium Ion Secondary Battery>

The lithium ion secondary battery that is an example of the presently disclosed electrochemical device can be produced by, for example, stacking the positive electrode and the negative electrode with the separator in-between, performing rolling, folding, or the like of the resultant laminate in accordance with the battery shape, as necessary, in order to place the laminate in a battery container, injecting the electrolyte solution into the battery container, and sealing the battery container. In order to prevent pressure increase inside the lithium ion secondary battery and occurrence of overcharging or overdischarging, an overcurrent preventing device such as a fuse or a PTC device, an expanded metal or a lead plate may be provided as necessary. The shape of the lithium ion secondary battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to measure and evaluate the iodine value of a polymer, the intrinsic viscosity of a polymer, the viscosity and dispersibility of a conductive material dispersion liquid, the viscosity stability of a conductive material dispersion liquid, rate characteristics, high-temperature storage characteristics, and gas release.

<Iodine Value of Polymer>

The iodine value of a polymer was measured in accordance with JIS K6235(2006).

<Intrinsic Viscosity of Polymer>

A produced polymer NMP solution (solid content concentration 8%) was dissolved in NMP. The intrinsic viscosity of the polymer at a temperature of 25±1° C. was then measured based on JIS K 7367-1.

<Viscosity and Dispersibility of Conductive Material Dispersion Liquid>

The viscosity of a produced conductive material dispersion liquid was measured for 120 seconds at a temperature of 25° C. and a shear rate of 10 s$^{-1}$ using a rheometer (MCR 302 produced by Anton Paar), and an average value of the viscosity was calculated for from 61 seconds after the start of measurement to 120 seconds after the start of measurement. The dispersibility of the conductive material dispersion liquid was evaluated by the following standard based on the obtained average value of the viscosity. A smaller viscosity for the conductive material dispersion liquid indicates that the conductive material dispersion liquid has better dispersibility.

A: 5 Pa·s or less
B: More than 5 Pa·s and not more than 15 Pa·s
C: More than 15 Pa·s and not more than 50 Pa·s
D: More than 50 Pa·s <Viscosity Stability of Conductive Material Dispersion Liquid>

The viscosity of a produced conductive material dispersion liquid was measured for 120 seconds at a temperature of 25° C. and a shear rate of 10 s$^{-1}$ using a rheometer (MCR 302 produced by Anton Paar), and an average value of the viscosity for from 61 seconds after the start of measurement to 120 seconds after the start of measurement was taken to be a measurement value η10 (straight after production). Next, the conductive material dispersion liquid was stored at a temperature of 25° C. for 7 days, was subsequently stirred for 1 hour using a planetary mixer (rotation speed: 60 rpm), and the conductive material dispersion liquid after stirring was measured in the same manner as for η10 (straight after production) in order to determine η10 (7 days after production).

A viscosity ratio Δη was calculated based on the following formula, and viscosity stability of the conductive material dispersion liquid was evaluated by the following standard based on the determined viscosity ratio Δη. A value of closer to 100% for the viscosity ratio Δη indicates that the conductive material dispersion liquid has better viscosity stability.

Viscosity ratio Δη=η10 (7 days after production)/
η10 (straight after production)×100(%)

A: Viscosity ratio Δη of not less than 80% and not more than 120%
B: Viscosity ratio Δη of not less than 60% and less than 80% or viscosity ratio Δη of more than 120% and not more than 140%
C: Viscosity ratio Δη of not less than 40% and less than 60% or viscosity ratio Δη of more than 140% and not more than 160%

D: Viscosity ratio Δη of not less than 0% and less than 40% or viscosity ratio Δη of more than 160% and not more than 200%

<Rate Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times. Next, 0.2 C constant-current charging and discharging was performed between cell voltages of 4.20 V and 3.00 V in an environment having a temperature of 25° C., and the discharge capacity at that time was defined as CO. Thereafter, the lithium ion secondary battery was CC-CV changed with a 0.2 C constant current in the same manner, was then CC discharged to 3.00 V with a 2.0 C constant current in an environment having a temperature of 25° C., and the discharge capacity at that time was defined as C1. A ratio (percentage; capacity maintenance rate) of the discharge capacity (C1) at 3.0 C relative to the discharge capacity (CO) at 0.2 C, expressed by (C1/C0)×100(%), was determined as a rate characteristic and was evaluated by the following standard. A larger value for the capacity maintenance rate indicates less reduction of discharge capacity at high current and lower internal resistance (i.e., better rate characteristics).

A: Capacity maintenance rate of 70% or more
B: Capacity maintenance rate of not less than 65% and less than 70%
C: Capacity maintenance rate of not less than 55% and less than 65%
D: Capacity maintenance rate of less than 55%

<High-Temperature Storage Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage 4.20 V) and was then CC discharged to a cell voltage of 3.00 V with a 0.2 C constant current. This charging and discharging at 0.2 C was repeated three times. The discharge capacity of the $3^{rd}$ cycle at 0.2 C was taken to be the initial capacity Cx. CC-CV charging was subsequently performed with a 0.2 C constant current (upper limit cell voltage 4.20 V). Next, the lithium ion secondary battery was stored for 4 weeks inside an inert oven in which the inside of a treatment chamber had been set to a nitrogen atmosphere of 60° C. Thereafter, the lithium ion secondary battery was discharged to a cell voltage of 3.00 V by a 0.2 C constant-current method, and the discharge capacity at that time was taken to be Cy. A high-temperature capacity maintenance rate expressed by (Cy/Cx)×100(%) was determined and was evaluated by the following standard. A larger value for this high-temperature capacity maintenance rate indicates that there is less degradation of the battery during high-temperature storage (i.e., better high-temperature storage characteristics).

A: High-temperature capacity maintenance rate of 80% or more
B: High-temperature capacity maintenance rate of not less than 75% and less than 80%
C: High-temperature capacity maintenance rate of not less than 70% and less than 75%
D: High-temperature capacity maintenance rate of less than 70%

<Gas Release>

A produced lithium ion secondary battery was left at rest for 24 hours in an environment having a temperature of 25° C. Thereafter, the lithium ion secondary battery was subjected to a charge/discharge operation of charging to 4.20 V at 0.1 C and discharging to 3.00 V at 0.1 C in an environment having a temperature of 25° C. The lithium ion secondary battery was subsequently immersed in liquid paraffin, and the volume V0 thereof was measured.

In addition, the lithium ion secondary battery was subjected to 200 cycles of an operation in which charging to 4.20 V at 1 C and discharging to 3.00 V at 1 C in an environment having a temperature of 60° C. was taken to be 1 cycle. The lithium ion secondary battery was subsequently immersed in liquid paraffin, and the volume V1 thereof was measured.

The volume change ΔV of the battery cell between before and after 200 cycles of charging and discharging was calculated by the following formula and was evaluated by the following standard. A smaller value for the volume change ΔV indicates that the lithium ion secondary battery has better gas release inhibiting ability.

Volume change $\Delta V=(V1-V0)/V0\times100(\%)$

A: Volume change ΔV of less than 18%
B: Volume change ΔV of not less than 18% and less than 22%
C: Volume change ΔV of not less than 22% and less than 26%
D: Volume change ΔV of 26% or more Example 1

<Production of Dispersant Composition>

A reactor having an internal capacity of 10 L was charged with 100 parts of deionized water, 35 parts of acrylonitrile as a nitrile group-containing monomer, and 65 parts of 1,3-butadiene as a conjugated diene monomer, and then 2 parts of potassium oleate as an emulsifier, 0.1 parts of potassium phosphate as a stabilizer, and 0.8 parts of tert-dodecyl mercaptan (TDM) as a molecular weight modifier were further added, and emulsion polymerization was performed at a temperature of 30° C. in the presence of 0.35 parts of potassium persulfate as a polymerization initiator so as to copolymerize the acrylonitrile and 1,3-butadiene.

At the point at which the polymerization conversion rate reached 95%, 0.2 parts of hydroxylamine sulfate was added per 100 parts of monomer to terminate polymerization. Next, heating was performed, steam distillation was performed at approximately 90° C. under reduced pressure to recover residual monomer, and then 0.1 parts of dibutylhydroxytoluene (BHT) was added as a substituted phenol to yield a water dispersion of a polymer.

Next, a 25 mass % aqueous solution of calcium chloride (CaCl$_2$)) was added as a coagulant under stirring in an amount such as to be 3 parts relative to 100 parts of polymer solid content in the obtained water dispersion, and the polymer in the water dispersion was caused to coagulate. Thereafter, the polymer was separated by filtration, 50 equivalents of deionized water relative to the obtained polymer was passed to perform water washing, and then the polymer was dried at a temperature of 90° C. under reduced pressure to yield a polymer precursor.

Next, the polymer precursor was hydrogenated by adopting oil-layer hydrogenation as the method of hydrogenation. The polymer precursor was dissolved in acetone with a concentration of 12% to obtain an acetone solution of the polymer precursor that was a subject for hydrogenation. This acetone solution was loaded into an autoclave, 500 ppm of palladium/silica (Pd/SiO$_2$) was added as a catalyst relative to 100% of the polymer precursor (hydrogenation subject), and then a hydrogenation reaction was performed at a temperature of 90° C. and a hydrogen pressure of 3.0 MPa for 6 hours to yield a hydrogenation reaction product. Once the hydrogenation reaction had ended, the palladium/silica was filtered off, and acetone serving as a solvent was removed under reduced pressure to yield a polymer (hereinafter, referred to as "polymer (a)").

The obtained polymer (a) was dissolved in a specific amount of NMP to obtain an NMP solution of the polymer (a) having a solid content concentration of 8% as a dispersant composition.

<Production of Conductive Material Dispersion Liquid>

A conductive material dispersion liquid was produced by using a disper blade to stir (3,000 rpm, 10 minutes) 5 parts of multi-walled carbon nanotubes (BET specific surface area: 250 m$^2$/g; hereinafter, denoted as "CNT") as a conductive material, 12.5 parts (equivalent to 1 part as solid content) of the dispersant composition (NMP solution of polymer (a) having solid content concentration of 8%) obtained as described above, and 82.5 parts of NMP as a solvent, and subsequently performing 1 hour of mixing at a circumferential speed of 8 m/s using a bead mill (LMZ015 produced by Ashizawa Finetech Ltd.) in which zirconia beads of 1 mm in diameter were used. The obtained conductive material dispersion liquid was used to measure and evaluate the viscosity and dispersibility of the conductive material dispersion liquid and also the viscosity stability of the conductive material dispersion liquid. The results are shown in Table 1.

<Production of Slurry for Positive Electrode>

In the conductive material dispersion liquid obtained as described above, 98.0 parts of a ternary active material having a layered structure (LiNi$_{0.8}$Co$_{0.1}$Mn$_{0.1}$O$_2$; average particle diameter: 10 μm) as a positive electrode active material, 1.0 parts of polyvinylidene fluoride as a polymer X, 1.0 parts (in terms of solid content) of the conductive material dispersion liquid obtained as described above, and NMP as a solvent were added and were mixed (60 rpm, 30 minutes) using a planetary mixer to produce a slurry for a position electrode. Note that the additive amount of NMP was adjusted such that the viscosity of the obtained slurry for a positive electrode (measured in accordance with JIS Z8803:1991 by single cylinder rotational viscometer; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry for a positive electrode was applied onto the aluminum foil by a comma coater such as to have a coating weight after drying of 20 mg/cm$^2$, was dried at 90° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including a positive electrode mixed material layer of 3.2 g/cm$^3$ in density and aluminum foil. The thickness of the sheet-shaped positive electrode was 70 μm. This sheet-shaped positive electrode was cut to 4.8 cm in width and 50 cm in length to obtain a positive electrode for a lithium ion secondary battery.

<Production of Negative Electrode>

A 5 MPa pressure-resistant vessel equipped with a stirrer was charged with 33 parts of 1,3-butadiene as a conjugated diene monomer, 3.5 parts of itaconic acid as an acidic group-containing monomer, 63.5 parts of styrene as an aromatic vinyl monomer, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the polymerization reaction and yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

Next, 48.75 parts of artificial graphite and 48.75 parts of natural graphite as negative electrode active materials and 1 part of carboxymethyl cellulose as a thickener were loaded into a planetary mixer. These materials were diluted to a solid content concentration of 60% with deionized water and were subsequently kneaded at a rotation speed of 45 rpm for 60 minutes. Thereafter, 1.5 parts in terms of solid content of the water dispersion containing the binder for a negative electrode obtained as described above was added and was kneaded therewith at a rotation speed of 40 rpm for 40 minutes. Deionized water was added to adjust the viscosity to 3,000±500 mPa·s (measured by B-type viscometer at 25° C. and 60 rpm) and thereby produce a slurry for a negative electrode mixed material layer.

Next, copper foil of 15 μm in thickness was prepared as a current collector. The slurry for a negative electrode mixed material layer was applied onto both sides of the copper foil such as to have a coating weight after drying of 10 mg/cm$^2$ at each side and was dried at 60° C. for 20 minutes and at 120° C. for 20 minutes. Thereafter, 2 hours of heat treatment was performed at 150° C. to obtain a negative electrode web. This negative electrode web was rolled by roll pressing to produce a sheet-shaped negative electrode including negative electrode mixed material layers (both sides) of 1.6 g/cm$^3$ in density and copper foil. The sheet-shaped negative electrode was cut to 5.0 cm in width and 52 cm in length to obtain a negative electrode for a lithium ion secondary battery.

<Production of Lithium Ion Secondary Battery>

The produced positive electrode for a lithium ion secondary battery and negative electrode for a lithium ion secondary battery were wound up with the electrode mixed material layers thereof facing each other and with a separator (microporous membrane made of polyethylene) of 15 μm in thickness in-between using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, a LiPF$_6$ solution of 1.0 M[in] concentration (solvent: mixed solvent of ethylene carbonate (EC)/diethyl carbonate (DEC)=3/7 (volume ratio); additive: containing 2 volume % (solvent ratio) of vinylene carbonate) was prepared as an electrolyte solution.

The compressed roll was subsequently enclosed in a laminate case made of aluminum together with 3.2 g of the non-aqueous electrolyte solution. A nickel lead was connected to a specific position on the negative electrode, an aluminum lead was connected to a specific position on the positive electrode, and then an opening of the case was heat sealed to obtain a lithium ion secondary battery. This lithium ion secondary battery had a pouch shape of a specific size capable of accommodating the roll. The nominal capacity of the battery was 700 mAh.

Rate characteristics, high-temperature storage characteristics, and gas release were evaluated for the produced lithium ion secondary battery. The results are shown in Table 1.

Example 2

A dispersant composition, a conductive material dispersion liquid, a slurry for a positive electrode, a positive electrode, a negative electrode, and a lithium ion secondary battery were produced in the same way as in Example 1 with the exception that in production of the polymer (a), the amount of BHT as a substituted phenol was changed to 0.2 parts. Measurements and evaluations were conducted in the same manner as in Example 1. The results are shown in Table 1.

Example 3

A dispersant composition, a conductive material dispersion liquid, a slurry for a positive electrode, a positive electrode, a negative electrode, and a lithium ion secondary battery were produced in the same way as in Example 1 with the exception that in production of the polymer (a), the amount of acrylonitrile as a nitrile group-containing monomer was changed to 12 parts. Measurements and evaluations were conducted in the same manner as in Example 1. The results are shown in Table 1.

Example 4

A dispersant composition, a conductive material dispersion liquid, a slurry for a positive electrode, a positive electrode, a negative electrode, and a lithium ion secondary battery were produced in the same way as in Example 1 with the exception that in production of the polymer (a), the iodine value of the polymer was adjusted to 55 mg/100 mg. Measurements and evaluations were conducted in the same manner as in Example 1. The results are shown in Table 1.

Example 5

A dispersant composition, a conductive material dispersion liquid, a slurry for a positive electrode, a positive electrode, a negative electrode, and a lithium ion secondary battery were produced in the same way as in Example 1 with the exception that in production of the polymer (a), the amount of TDM as a molecular weight modifier was changed to 0.8 parts. Measurements and evaluations were conducted in the same manner as in Example 1. The results are shown in Table 1.

Example 6

A dispersant composition, a conductive material dispersion liquid, a slurry for a positive electrode, a positive electrode, a negative electrode, and a lithium ion secondary battery were produced in the same way as in Example 1 with the exception that in production of the polymer (a), the amount of TDM as a molecular weight modifier was changed to 0.6 parts. Measurements and evaluations were conducted in the same manner as in Example 1. The results are shown in Table 1.

Example 7

A dispersant composition, a conductive material dispersion liquid, a slurry for a positive electrode, a positive electrode, a negative electrode, and a lithium ion secondary battery were produced in the same way as in Example 6 with the exception that in production of the polymer (a), the amount of acrylonitrile as a nitrile group-containing monomer was changed to 55 parts. Measurements and evaluations were conducted in the same manner as in Example 1. The results are shown in Table 1.

Example 8

A dispersant composition, a conductive material dispersion liquid, a slurry for a positive electrode, a positive electrode, a negative electrode, and a lithium ion secondary battery were produced in the same way as in Example 4 with the exception that in production of the polymer (a), the amount of TDM as a molecular weight modifier was changed to 0.6 parts. Measurements and evaluations were conducted in the same manner as in Example 1. The results are shown in Table 1.

Example 9

A dispersant composition containing a polymer (b) produced as described below instead of a polymer (a) was used. With the exception of the above, a conductive material dispersion liquid, a slurry for a positive electrode, a positive electrode, a negative electrode, and a lithium ion secondary battery were produced in the same way as in Example 1. Measurements and evaluations were conducted in the same manner as in Example 1. The results are shown in Table 1.

<Production of Polymer (b)>

An autoclave equipped with a stirrer was charged with 164 parts of deionized water, 35 parts of 2-ethylhexyl acrylate as a (meth)acrylic acid ester monomer, 32 parts of styrene as an aromatic vinyl monomer, 30 parts of acrylonitrile as a nitrile group-containing monomer, 3 parts of methacrylic acid as an acidic group-containing monomer, 0.3 parts of potassium persulfate as a polymerization initiator, 1.2 parts of sodium polyoxyethylene alkyl ether sulfate as an emulsifier, and 0.6 parts of TDM as a molecular weight modifier. These materials were thoroughly stirred, and were then heated to 70° C. for 3 hours and to 80° C. for 2 hours so as to perform polymerization and yield a water dispersion of a polymer. Note that the solid content concentration of the water dispersion was 37.3%, and the polymerization conversion rate determined from the solid content concentration was 96%.

Next, heating was performed, steam distillation was performed at approximately 90° C. under reduced pressure to recover residual monomer, and then 0.1 parts of BHT was added as a substituted phenol to yield a water dispersion of a polymer.

Thereafter, 200 parts of NMP as a solvent was added to 100 parts of the obtained water dispersion of the polymer, water and residual monomer were completely evaporated under reduced pressure, and then NMP was evaporated to yield an NMP solution of a polymer (b) having a solid content concentration of 8 mass %.

Comparative Example 1

In production of the polymer (a), the amount of TDM as a molecular weight modifier was changed to 0.7 parts and polymerization was ended at the point at which the polymerization conversion rate reached 90%. Moreover, a substituted phenol was not used, and the coagulant was changed to magnesium sulfate ($MgSO_4$) in an amount such as to be 12 parts. Furthermore, the drying temperature of the polymer was changed to 60° C., and the hydrogenation reaction temperature was changed to 50° C. With the exception of the above, a dispersant composition, a conductive material dispersion liquid, a slurry for a positive electrode, a positive electrode, a negative electrode, and a lithium ion secondary battery were produced in the same way as in Example 1. Measurements and evaluations were conducted in the same manner as in Example 1. The results are shown in Table 1.

Comparative Example 2

Measurements and evaluations were conducted in the same manner as in Example 1 with the exception that a dispersant composition containing a hydrogenated polymer produced as described below was used as a dispersant composition. The results are shown in Table 1.
<Production of Dispersant Composition>

A pre-hydrogenation polymer precursor was produced by a batch process in a stirring autoclave having a capacity of 2 m$^3$. In each batch, 350 kg of a monomer composition (acrylonitrile: 1,3-butadiene=35:65 (by mass)) and 700 kg (total amount) of water were used. First, the autoclave was charged with 9.8 kg of Erkantol® BXG (Erkantol is a registered trademark in Japan, other countries, or both), 2.94 kg of Baykanol® PQ (Baykanol is a registered trademark in Japan, other countries, or both), and 1.96 kg of coconut fatty acid potassium salt as emulsifiers in 600 kg of water together with 180 g of potassium hydroxide, and was purged using a stream of nitrogen. After the nitrogen purging was complete, monomers (196 kg of butadiene and 154 kg of acrylonitrile) from which a stabilizer had been removed and one portion of TDM (0.4 parts relative to 100 parts of monomer composition) as a molecular weight modifier were added into the reactor. The reactor was subsequently closed. The remaining amount of water (100 kg) was used to produce an aqueous solution of tris($\alpha$-hydroxyethyl)amine and potassium peroxodisulfate and a polymerization inhibitor solution. Aqueous solution containing 950 g of potassium peroxodisulfate (0.27 parts) and 530 g of tris($\alpha$-hydroxyethyl)amine (0.15 parts) was added to thereby initiate polymerization at 20° C., and this temperature was maintained throughout the entire polymerization time. Progression of polymerization was monitored in each case through gravimetric analysis of the conversion rate. Once the polymerization conversion rate was 15%, further TDM (0.4 parts relative to 100 parts of monomer composition) was added as a molecular weight modifier. After 7 hours of polymerization time, an aqueous solution of sodium dithionite/N, N-diethylhydroxylamine (DEHA) and potassium hydroxide was added to terminate polymerization. The polymerization conversion rate was 85%. Steam distillation was performed so as to remove unconverted monomer and other volatile components.

In addition, 0.25 parts of BHT as a substituted phenol was added to a water dispersion of a polymerization reaction product obtained in this manner.

Next, a 25 mass % aqueous solution of calcium chloride ($CaCl_2$)) was added as a coagulant under stirring in amount such as to be 2.37 parts relative to 100 parts of polymerized product solid content in the obtained water dispersion, and the polymerized product in the water dispersion was caused to coagulate. Thereafter, the polymerized product was separated by filtration, 50 equivalents of deionized water relative to the obtained polymerized product was passed to perform water washing, and then drying was performed at 70° C. under reduced pressure to yield a pre-hydrogenation polymer.

Next, a hydrogenation reaction was performed with a hydrogen pressure of 190 bar, a temperature of 138° C., and a solid content of 17.5%. Note that the hydrogenation reaction was performed using 0.15% of tris(triphenylphosphine)rhodium(I) chloride (Evonik-Degussa) as a catalyst and 0.2 phr of triphenylphosphine (Merck Schuchardt OHG; Catalogue No. 8.08270) as a promotor based on 100 g of the pre-hydrogenation polymer (phr).

In the hydrogenation reaction, 5.25 kg of the pre-hydrogenation polymer was dissolved in 24.25 kg of chlorobenzene to obtain a polymer solution in a 40 L autoclave. Prior to the hydrogenation reaction, this polymer solution was continuously brought into contact with nitrogen (20 bar) once and hydrogen (20 bar) twice under stirring, and was then depressurized. This reaction mixture was heated to 120° C. and was brought into contact with 19 MPa of hydrogen. In the next step, 10.5 g of the triphenylphosphine promotor as a solution in 250 g of chlorobenzene was added by metered injection. Hydrogenation was then initiated addition through of 7.875 g of tris(triphenylphosphine)rhodium(I) chloride dissolved in 250 g of chlorobenzene. The internal temperature gradually increased to 120° C. as the reaction diminished. Online monitoring of the hydrogenation process was performed through measurement of hydrogen absorption. Once the percentage hydrogenation reached 99.4±0.2%, the reaction mixture was cooled to quench the hydrogenation. Next, this batch was depressurized. Nitrogen was then passed so as to remove remaining hydrogen. After the hydrogenation reaction had ended, 0.2 parts of activated carbon having an average diameter of 15 µm was added into the reactor and was stirred for 30 minutes. Thereafter, filtration was carried out using a filter having a pore diameter of 5 µm. Steam was introduced into the filtrate, and monochlorobenzene was removed and recovered through steam distillation. Precipitated hydrogenated product was recovered by separation and drying under reduced pressure.

The obtained polymer was dissolved in a specific amount of NMP to obtain an NMP solution having the polymer dissolved with a solid content concentration of 8% in NMP.

Comparative Example 3

In production of the polymer (a), the amount of TDM as a molecular weight modifier was changed to 0.2 parts and the emulsion polymerization temperature was changed to 60° C. Moreover, BHT was not used as a substituted phenol, and the drying temperature of the polymer was changed to 120° C. With the exception of the above, a dispersant composition, a conductive material dispersion liquid, a slurry for a positive electrode, a positive electrode, a negative electrode, and a lithium ion secondary battery were produced in the same way as in Example 1. Measurements and evaluations were conducted in the same manner as in Example 1. The results are shown in Table 1.

Comparative Example 4

In production of the polymer (a), the amount of TDM as a molecular weight modifier was changed to 2 parts, a substituted phenol was not used, and the coagulant was changed to $MgSO_4$ in an amount such as to be 12 parts. Moreover, the drying temperature of the polymer was changed to 60° C., and the hydrogenation reaction temperature was changed to 50° C. With the exception of the above, a dispersant composition, a conductive material dispersion liquid, a slurry for a positive electrode, a positive electrode, a negative electrode, and a lithium ion secondary battery were produced in the same way as in Example 1. Measurements and evaluations were conducted in the same manner as in Example 1. The results are shown in Table 1.

TABLE 1

| | | Example 1 | Example 2 | Example 3 | Example 4 | Example 5 | Example 6 | Example 7 |
|---|---|---|---|---|---|---|---|---|
| Polymer | Acrylonitrile monomer [parts] | 35 | 35 | 12 | 35 | 35 | 35 | 55 |
| | Iodine value [mg/100 mg] | 5 | 5 | 5 | 55 | 5 | 5 | 5 |
| | Intrinsic viscosity [dL/g] | 0.27 | 0.24 | 0.19 | 0.26 | 0.68 | 0.86 | 1.02 |
| Conductive material | Type | CNT | CNT | CNT | CNT | CNT | CNT | CNT |
| | BET specific surface area [m²/g] | 250 | 250 | 250 | 250 | 250 | 250 | 250 |
| Conductive material dispersion liquid | Solid content concentration [%] | 6 | 6 | 6 | 6 | 6 | 6 | 6 |
| | Viscosity [Pa · s] | 3.1 | 3.0 | 2.9 | 5.3 | 3.8 | 4.9 | 17 |
| Evaluation | Dispersibility of conductive material dispersion liquid | A | A | A | B | A | A | C |
| | Viscosity stability of conductive material dispersion liquid | A | B | C | B | A | A | B |
| | Rate characteristics | A | A | A | B | A | A | B |
| | High-temperature storage characteristics | A | A | B | B | A | A | A |
| | Gas release | B | B | C | C | A | A | A |

| | | Example 8 | Example 9 | Comparative Example 1 | Comparative Example 2 | Comparative Example 3 | Comparative Example 4 |
|---|---|---|---|---|---|---|---|
| Polymer | Acrylonitrile monomer [parts] | 35 | 35 | 35 | 35 | 35 | 35 |
| | Iodine value [mg/100 mg] | 55 | — | 5 | 5 | 5 | 5 |
| | Intrinsic viscosity [dL/g] | 0.96 | 0.55 | 1.35 | 1.48 | 1.75 | 0.14 |
| Conductive material | Type | CNT | CNT | CNT | CNT | CNT | CNT |
| | BET specific surface area [m²/g] | 250 | 250 | 250 | 250 | 250 | 250 |
| Conductive material dispersion liquid | Solid content concentration [%] | 6 | 6 | 6 | 6 | 6 | 6 |
| | Viscosity [Pa · s] | 9.8 | 10.2 | >50 | 21 | >50 | 16 |
| Evaluation | Dispersibility of conductive material dispersion liquid | B | B | D | C | D | C |
| | Viscosity stability of conductive material dispersion liquid | C | C | C | D | C | D |
| | Rate characteristics | B | A | D | D | D | D |
| | High-temperature storage characteristics | B | A | B | C | D | B |
| | Gas release | B | B | D | D | C | D |

It can be seen from Table 1 that a secondary battery having excellent rate characteristics and high-temperature storage characteristics was obtained in Examples 1 to 9 in which the used dispersant composition contained a polymer that included a nitrile group-containing monomer unit and had a specific intrinsic viscosity.

It can also be seen from Table 1 that rate characteristics of a secondary battery deteriorated in Comparative Examples 1 to 4 in which the used dispersant composition contained a polymer that included a nitrile group-containing monomer unit but did not have the specific intrinsic viscosity.

INDUSTRIAL APPLICABILITY

According to the present disclosure, it is possible to provide a dispersant composition for an electrochemical device that can cause an electrochemical device to display excellent rate characteristics and high-temperature storage characteristics.

Moreover, according to the present disclosure, it is possible to provide a conductive material dispersion liquid for an electrochemical device and a slurry for an electrochemical device electrode that can cause an electrochemical device to display excellent rate characteristics and high-temperature storage characteristics.

Furthermore, according to the present disclosure, it is possible to provide an electrode for an electrochemical device that can cause an electrochemical device to display excellent electrical characteristics and an electrochemical device that has excellent rate characteristics and high-temperature storage characteristics.

The invention claimed is:

1. A dispersant composition for an electrochemical device comprising a polymer A and a substituted phenol, wherein
the polymer A includes a acrylonitrile monomer unit and an alkylene structural unit derived from 1,3-butadiene, or the polymer A includes the acrylonitrile monomer unit and a 2-ethylhexyl acrylate monomer unit, a styrene monomer unit, and a methacrylic acid monomer unit,
the dispersant composition including the polymer A and the substituted phenol has an intrinsic viscosity of not less than 0.15 dL/g and less than 1.20 dL/g when dissolved in N-methyl-2-pyrrolidone and measured at a temperature of 25° C.,
the polymer A satisfies at least one of the following features I and II:
feature I: proportional content of the acrylonitrile monomer unit in the polymer A is not less than 15 mass % and not more than 50 mass % and proportional content of the alkylene structural units derived from 1,3-butadiene in the polymer A is 40 mass % or more and is 90 mass % or less, when all repeating units in the polymer A are taken to be 100 mass %, and an iodine value of the polymer A is 1 mg/100 mg or more and 60 mg/100 mg or less, and
feature II: proportional content of the acrylonitrile monomer unit in the polymer A is not less than 15 mass % and not more than 50 mass % and a rest of the polymer A is occupied by the 2-ethylhexyl acrylate monomer unit, the styrene monomer unit, and the methacrylic acid monomer unit,
not less than 0.01 mass % and not more than 0.2 mass % of the substituted phenol is included relative to the polymer A.

2. A conductive material dispersion liquid for an electrochemical device comprising at least: the dispersant composition for an electrochemical device according to claim 1; a conductive material; and a solvent.

3. The conductive material dispersion liquid for an electrochemical device according to claim 2, wherein the conductive material is one or more carbon nanotubes.

4. The conductive material dispersion liquid for an electrochemical device according to claim 2, having a solid content concentration of not less than 0.01 mass % and not more than 10 mass % and a viscosity at a shear rate of $10\ s^{-1}$ of not less than 0.05 Pa·s and not more than 15.0 Pa·s.

5. A slurry for an electrochemical device electrode comprising at least: the dispersant composition for an electrochemical device according to claim 1; a conductive material; a solvent; and an electrode active material.

6. A method of producing an electrode for an electrochemical device comprising forming an electrode mixed material layer using the slurry for an electrochemical device electrode according to claim 5.

7. A method of producing an electrochemical device comprising using, as an electrode, an electrode for an electrochemical device obtained by the method according to claim 6.

8. A conductive material dispersion liquid for an electrochemical device comprising at least: a dispersant composition for an electrochemical device containing a polymer A; a conductive material; and a solvent, and having a solid content concentration of not less than 0.01 mass % and not more than 10 mass % and a viscosity at a shear rate of $10\ s^{-1}$ of not less than 0.05 Pa·s and not more than 15.0 Pa·s, wherein
the polymer A includes a acrylonitrile monomer unit an alkylene structural unit derived from 1,3-butadiene, or the polymer A includes the acrylonitrile monomer unit and a 2-ethylhexyl acrylate monomer unit, a styrene monomer unit, and a methacrylic acid monomer unit,
the polymer A satisfies at least one of the following features I and II:
feature I: the polymer A includes the acrylonitrile monomer unit in a proportion of not less than 15 mass % and not more than 50 mass % and proportional content of the alkylene structural units derived from 1,3-butadiene in the polymer A is 40 mass % or more and is 90 mass % or less, when all repeating units in the polymer A are taken to be 100 mass %, and an iodine value of the polymer A is 1 mg/100 mg or more and 60 mg/100 mg or less, and
feature II: proportional content of the acrylonitrile monomer unit in the polymer A is not less than 15 mass % and not more than 50 mass % and a rest of the polymer A is occupied by the 2-ethylhexyl acrylate monomer unit, the styrene monomer unit, and the methacrylic acid monomer unit,
the dispersant composition including the polymer A and the substituted phenol has an intrinsic viscosity of not less than 0.15 dL/g and less than 1.20 dL/g when dissolved in N-methyl-2-pyrrolidone and measured at a temperature of 25° C., and
the conductive material is one or more carbon nanotubes and
the dispersant composition for an electrochemical device further contains not less than 0.01 mass % and not more than 0.2 mass % of a substituted phenol relative to the polymer A.

9. A slurry for an electrochemical device electrode comprising at least:
the conductive material dispersion liquid for an electrochemical device according to claim 8; and an electrode active material.

10. An electrode for an electrochemical device comprising an electrode mixed material layer formed using the slurry for an electrochemical device electrode according to claim 9.

11. An electrochemical device comprising the electrode for an electrochemical device according to claim 10.

* * * * *